J. B. STRUBLE.
SIGNALING SYSTEM.
APPLICATION FILED FEB. 13, 1903.
1,128,075.
Patented Feb. 9, 1915
3 SHEETS—SHEET 1.
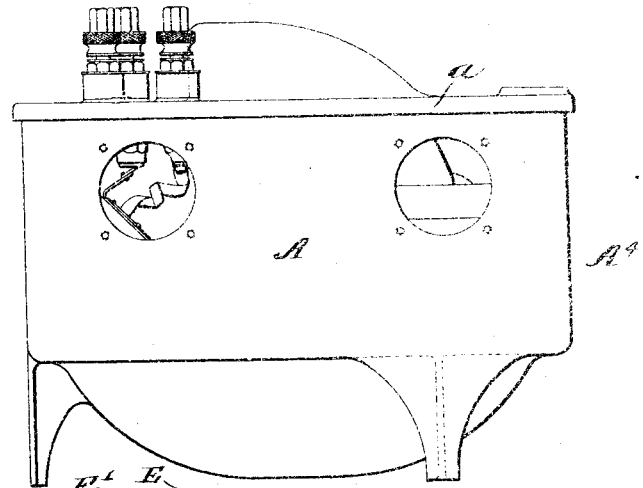
Fig. 1.
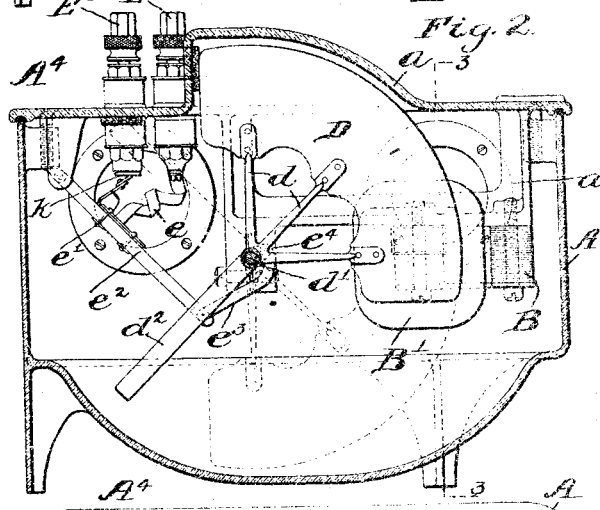
Fig. 2.
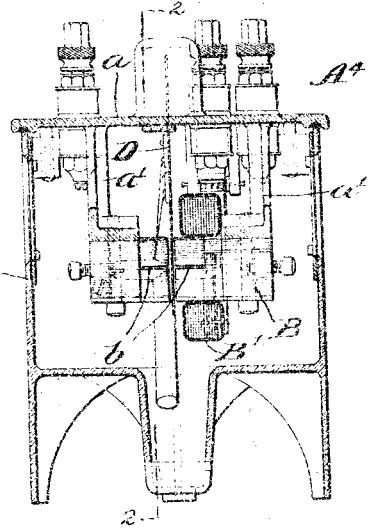
Fig. 3.
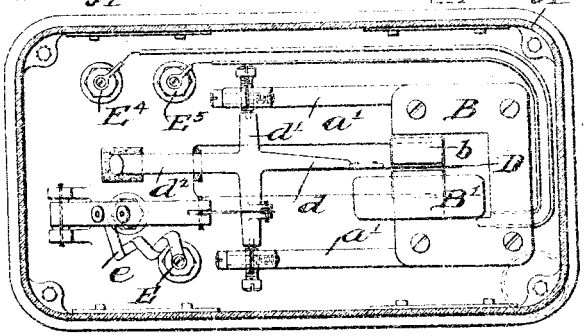
Fig. 4.
Fig. 5.
WITNESSES:
E. Harmes
W. W. Coleman
INVENTOR
Jacob B. Struble
BY
Geo. E. Cruse
HIS ATTORNEY 1,128,075.

Patented Feb. 9, 1915.

INVENTOR
Jacob B. Struble

J. B. STRUBLE.
SIGNALING SYSTEM.
APPLICATION FILED FEB. 15, 1903.

1,128,075.

Patented Feb. 9, 1915.
3 SHEETS—SHEET 3.

WITNESSES:
E. Harmes
W. W. Coleman

INVENTOR
Jacob B. Struble
BY
HIS ATTORNEY

UNITED STATES PATENT OFFICE.

JACOB B. STRUBLE, OF WILKINSBURG, PENNSYLVANIA, ASSIGNOR TO THE UNION SWITCH AND SIGNAL COMPANY, OF SWISSVALE, PENNSYLVANIA, A CORPORATION OF PENNSYLVANIA.

SIGNALING SYSTEM.

1,128,075.  Specification of Letters Patent.  Patented Feb. 9, 1915.

Application filed February 12, 1903. Serial No. 143,219.

*To all whom it may concern:*

Be it known that I, JACOB B. STRUBLE, a citizen of the United States, residing at Wilkinsburg, in the county of Allegheny and State of Pennsylvania, have invented certain new and useful Improvements in Signaling Systems, of which the following is a specification.

My invention relates to a signaling system for electric railways. My invention would apply to the signaling of any railway where the track circuits thereof may be affected by foreign currents.

A fundamental feature of my invention resides in means hereinafter designated as a translating device, which is operated from a signaling current in a track circuit to control one operation of a railway signal, and which when the alternating current from the track circuit is short-circuited controls another operation of the railway signal, and which will not respond to a direct current flowing in the track to control a signal.

The translating device comprises a non-magnetic movable element or member and means or devices which are affected by the alternating signaling current in such manner as to produce a movement of the said element or member by a shifting magnetic field.

In order to establish a shifting magnetic field, it is only necessary that the fields of which the resulting shifting magnetic field is made up, be magnetically displaced with reference to each other but within each other's influence, and that these fields be mutually out of phase. Since a magnetic field is in phase with the current which produces it, in order to establish magnetic fields of different phase relation, it is only necessary to vary the phase relation of the currents producing them. Manifestly, a shifting magnetic field may be produced by many different arrangements of parts and methods, and I do not wish to be limited to the particular form shown.

I will describe a translating device embodying my invention together with its applications in a signaling system applied to railways, and then point out the novel features thereof in claims.

Figure 6:
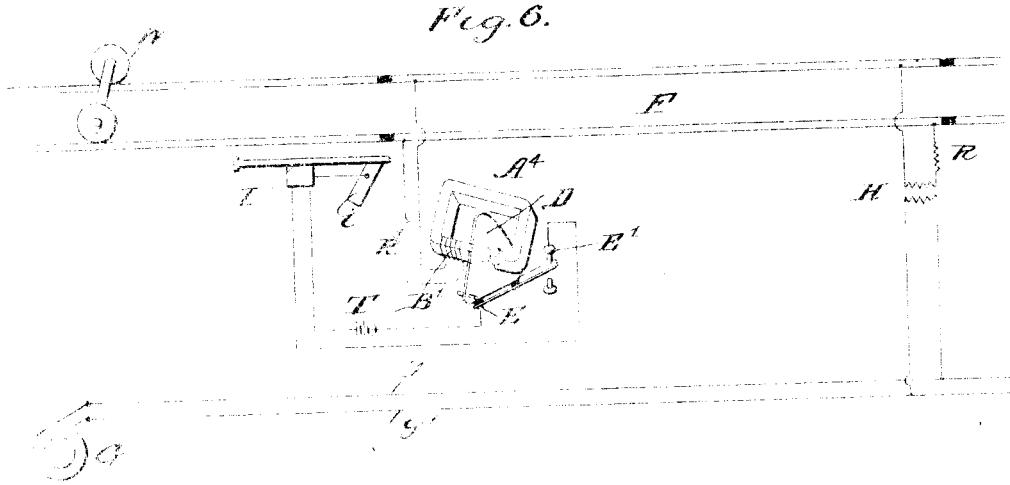
Figure 7:
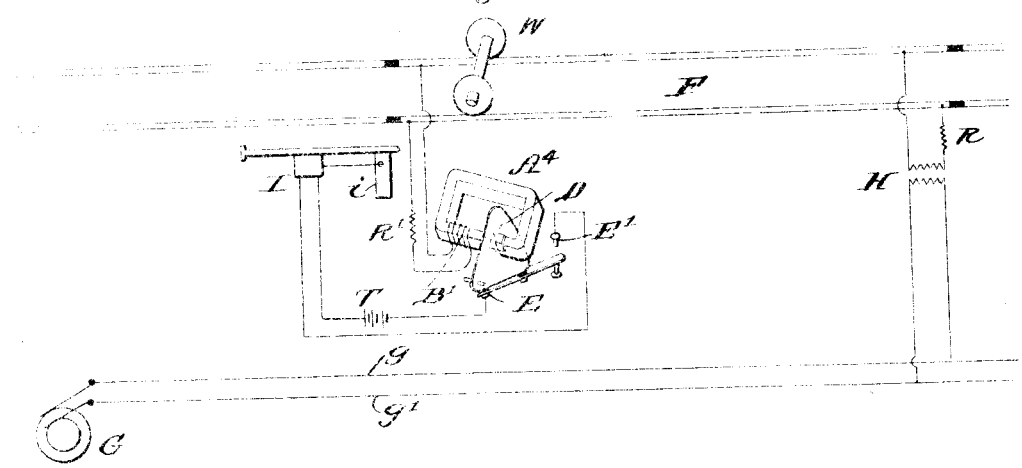
Figure 8:
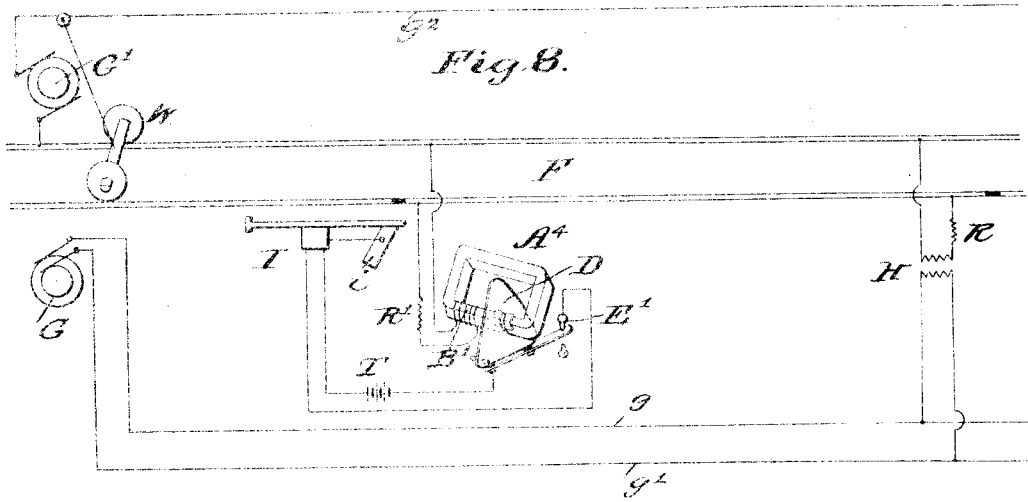
Figure 9:
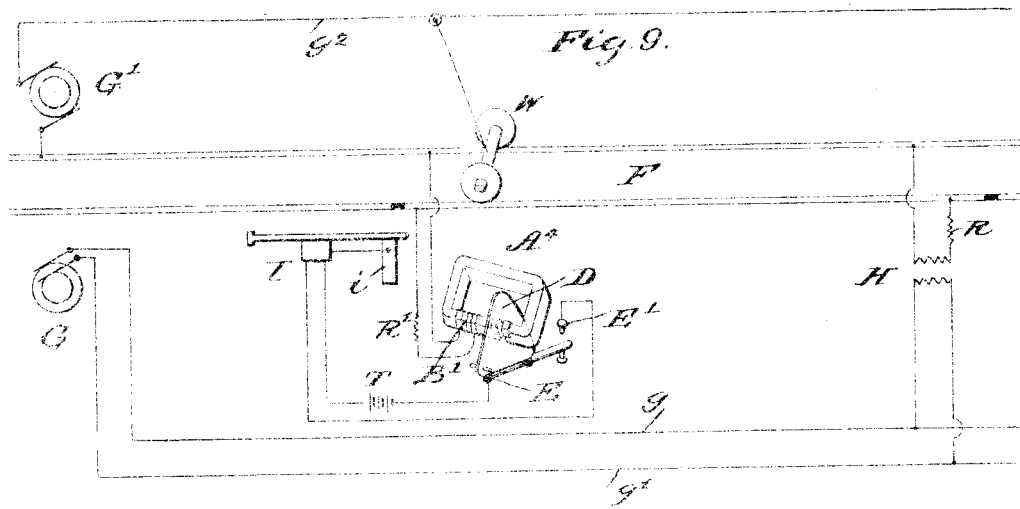

In the accompanying drawings, Figure 1 is an elevation of a translating device on the shifting field principle embodying my invention. Fig. 2 is a vertical and longitudinal sectional view of the translating device taken on the line 2—2 of Fig. 3. Fig. 3 is a vertical and transverse sectional view of the translating device taken on the line 3—3 of Fig. 2. Fig. 4 is a bottom plan view of the translating device, the bottom wall of the casing being removed. Fig. 5 is a diagrammatic view showing the arrangement of parts. Fig. 6 is a diagrammatical view of a railway, (other than one using a track or rail return for the alternating current propulsion,) a relay, a railway signal and the necessary circuits and sources of current supply for the circuits and embodying my invention. Fig. 7 is a view similar to Fig. 5 but showing a different condition of the circuits and parts due to the presence of a train. Fig. 8 is a diagrammatic view of a railway employing direct current for propelling the cars along the railway and using a track or rail return, a relay, a railway signal and the necessary circuits and sources of energy embodying my invention. Fig. 9 is a view similar to Fig. 8, but showing a different condition of the circuits and parts due to the presence of a train.

Similar letters of reference designate corresponding parts in all figures.

In Figs. 1 to 5, I have illustrated a translating device in the form of a relay $A^4$ provided with a movable element or armature which is rotated or operated in one direction under the influence of a shifting field produced by an alternating current. A designates a casing provided with a removable top or cover $a$, to which the mechanism is attached. The casing may be of any size or shape and of any material. I preferably employ a rectangular shaped casing made of metal having suitable openings in its side wall which are closed by some transparent substance. The top and bottom wall of the casing are also provided with recesses to receive a rotating disk segment which serves as an armature. $a^1$ designates a pair of depending brackets to which a laminated core B is secured. As shown in Fig. 4 the core is substantially C shaped. $B^1$ designates a primary actuating coil provided on one pole of the core B which is in circuit with a source of alternating current supply. Also, provided on each pole of the core is a coil $b$ closed upon itself and here shown as consisting of a band of conducting metal. One side of each coil $b$ is located in a slot in the core so that the magnetic field due to the current passing through the coil $B^1$ is displaced with reference to the magnetic field set up by the current passing through the coils $b$, and inasmuch as the currents in the coils $b$ are produced by induction from the currents in the coil $B^1$, there will also be a displacement of phase, and a shifting magnetic field will result.

D designates a rotating disk segment serving as the movable element or armature, which is preferably of some non-magnetic but electric conducting material as for example, aluminum. It is pivotally mounted with relation to the poles of the core C so as to be affected by the shifting magnetic field. The armature D is carried by a number of arms $d$ radiating from a shaft $d^1$ which latter is mounted at its ends upon oppositely arranged screws which serve as a center about which the armature D rotates. The rotating effect of gravity upon armature D is in excess of that upon its counter-weight $d^2$ by an amount which is sufficient, when the energizing current is removed, to produce a movement resulting in opening contact $k$. The object of providing counter-weight $d^2$ is to reduce the amount of alternating current necessary to rotate the disk to close contact $k$. In the present invention, the armature when rotated in one direction under the influence of the shifting magnetic field closes a local circuit, as for example, a railway signal circuit; and when rotated in the reverse or opposite direction under the influence of gravity, it will open the local circuit.

E, $E^1$, designate two binding posts secured to the top $a$ and which are included in a local circuit. One of the binding posts E, is electrically connected by means of a flexible ribbon of copper, $e$ to a contact part, $e^1$ carried by a lever $e^2$ which is pivoted at one end to the cover $a^1$. The other end of the lever is connected by a link $e^3$ with an arm $e^4$ carried by the shaft. The plate $e^1$ is adapted to make a contact with the binding post $E^1$ when the armature D is rotated in one direction, and to move away from the binding post when rotated in the opposite or reverse direction. (See dotted lines Fig. 2 for reverse position of armature). Preferably the contact will be made when the armature is rotated under the influence of the shifting magnetic field and the contact broken when a reverse rotation occurs due to the absence of the shifting magnetic field and the action of gravity. From Fig. 5 it will be further observed that the arm $e^4$, link $e^3$, lever $e^2$ and contact piece $e^1$ together with binding post $E^1$, have such mutual mechanical relations that at the moment contact $k$ is closed, and the consequent resistance to a further movement of disk D increases, that the latter has, due to the diminishing angle between $e^3$ and $e^4$, a corresponding increasing leverage to bend contact $e^1$ (which is flexible) causing desirable sliding of the contact as well as increased pressure. In other words, with a constant rotating effect exerted upon disk D, through a considerable distance, we are able to secure a constantly increasing contact pressure through a correspondingly diminishing distance due to the above mentioned arrangement of parts. This shifting field relay is applicable to the signaling of electric roads using direct current as a motive power as illustrated in Figs. 8 and 9. In such cases, by applying alternating current to the track circuit for operating the signal system, the relay will protect the signals against foreign influences such as that of the direct current of the propulsion system. This will be readily understood because direct current is not capable of establishing a shifting magnetic field, upon which principle the relay operates.

Referring now to Figs. 6 and 7 wherein I have illustrated diagrammatically a portion of a railroad track, the relay of Figs. 1 to 5, a railway signal and the necessary circuit connections. F designates the parallel lines of rails each of which is divided into insulated sections, the line of rails in each section being electrically connected. G designates a source of alternating signaling current supply and $g$, $g^1$ the feed wires leading therefrom and which extend along the line of rails. H designates a transformer for supplying signaling current to the track circuit, one being provided for each insulated section or block to step down the current from the feed wires. The primary winding of each transformer is included in multiple circuit with the feed wires while the secondary windings are in circuit with the lines of rail of each insulated section or block. In circuit with the secondary winding is connected non-inductive resistance R for the purpose of preventing an excessive flow of current when the section is occupied by a train. At the opposite end of the section, a relay $A^4$ is also in circuit with the opposite lines of rails of each insulated section, it being connected to the rails by wires leading from binding posts $E^4$, $E^5$, which binding posts are in circuit with the primary coil $B^1$. In circuit with the primary coil $B^1$ is non-inductive resistance R' which serves to prevent an excessive flow of current through the relay. This is not essential, however. It will be seen, therefore, that when no train or pair of wheels is on an insulated section, the alternating signaling current in the track circuit of that section will flow through the coil $B^1$ of the relay of that section and cause the armature D to rotate to close a contact in a circuit including the binding posts E, E¹, and battery or other source of current T which circuit may include an electro-magnetic controlling device of an automatic railway signal I, which may be any of the well known types. The position of the armature of the relay of the insulated section and the position of the signal device $i$ of the railway signal I controlling that section when no train or pair of wheels is on it is shown in Fig. 6, the signal device $i$ being in the position to display a "safety" signal.

Fig. 7 illustrates the system and parts illustrated in Fig. 6, but in their condition and positions when a pair of wheels W is on the insulated section of track. The wheels W in this instance forms a short circuit for the alternating current in the track, so that the relay will not be affected by the current and the armature will rotate in the reverse or opposite direction and open the local circuit in which the binding posts E, E¹, are included. With the local circuit open, the signal device $i$ will occupy a position or display a "danger" signal.

Referring now to Figs. 8 and 9, the same system and parts are illustrated with the exception that only one of the lines of rails is insulated. With only one line of rail insulated, the system is applicable to roads using direct current for propulsion of cars and the track as a return for the propulsion current. One of the wires $g$, $g^1$ may be dispensed with and the other terminal of the generator supplying current to the track circuit may be connected to the continuous rail. $G^1$ represents a direct generator for supplying motive power and $g^2$ the conductor for its transmission.

Wherever I herein use the term "railway signal," I mean to include a visual signal device, which by its position relatively to its support, by color or by other means of displaying information, gives indication of the service condition of the railway or section of railway which it is intended to govern, and a mechanism or apparatus for operating the signal device. Wherever I herein use the term "translating device" I mean any device or apparatus by which electrical current is translated or transformed into some other form of energy, preferably mechanical motion. Wherever I herein use the term "system," "signal system" or "signaling system", I mean such a combination or arrangement of devices and circuits together with their connections which enables a railway signal to be operated either automatically or manually. In the present invention the railway signal is intended to be controlled automatically and by the passage of a train over the railway or section of railway which the railway signal governs.

I am to be understood as describing and claiming the exclusion of direct current only from the operation of the signal.

What I claim as my invention is:

1. In a signaling system, the combination of a closed track circuit, an alternating signaling current supply therefor, a signal, and means to control the operation of the signal, said means responding to the absence or presence of the alternating signaling current and not responding to direct current, said means comprising a magnet energized from the track circuit, means associated with the core of the magnet for causing alternating current to produce a shifting magnetic field, and a moving element of non-magnetic material located in the shifting magnetic field and movable between the poles in response to the shifting magnetic field.

2. The combination with a railway track, insulation in both lines of rails to divide the track into sections, a transformer for each section having its secondary winding connected with the opposite rails of the section, a relay device for each section comprising a magnet, the coil of which is connected with the opposite rails, means associated with the core of the magnet for causing alternating current in the winding to produce a shifting magnetic field, and an armature of non-magnetic material movable between the poles of the magnet in response to the shifting magnetic field, and said relay responding to the presence or absence of the alternating signaling current supplied by its transformer and not to direct current in its control of a signal, a source of alternating current, feeder mains extending therefrom and independent of the track rails and having connected therewith in multiple circuit the primary windings of the transformers, and railway signals controlled by the relays.

In testimony whereof, I have signed my name to this specification in the presence of two subscribing witnesses.

JACOB E. STRUBLE.

Witnesses:
 GEO. E. CRUSE,
 W. L. McDANIEL.